(12) United States Patent
Chergui (10) Patent No.: US 9,718,265 B2
(45) Date of Patent: Aug. 1, 2017

(54) METHOD FOR PRODUCING A COMPOSITE SHEET METAL PART HAVING A METALLIC REGION, AND CORRESPONDING MOLDING TOOL

(71) Applicant: Azeddine Chergui, Dortmund (DE)

(72) Inventor: Azeddine Chergui, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 124 days.

(21) Appl. No.: 14/282,830

(22) Filed: May 20, 2014

(65) Prior Publication Data

US 2014/0251531 A1   Sep. 11, 2014

Related U.S. Application Data

(63) Continuation of application No. PCT/EP2012/073178, filed on Nov. 21, 2012.

(30) Foreign Application Priority Data

Nov. 23, 2011  (DE) .................. 10 2011 055 654

(51) Int. Cl.
| | | |
|---|---|---|
| *B29C 51/14* | (2006.01) |
| *B32B 38/00* | (2006.01) |
| *B21D 22/02* | (2006.01) |
| *B23K 11/00* | (2006.01) |
| *B23K 11/087* | (2006.01) |
| *B23K 11/16* | (2006.01) |
| *B23K 11/31* | (2006.01) |
| *B21D 22/20* | (2006.01) |
| *B32B 37/30* | (2006.01) |

(Continued)

(52) U.S. Cl.
CPC ........ *B32B 38/0012* (2013.01); *B21D 22/022* (2013.01); *B21D 22/203* (2013.01); *B23K 11/0026* (2013.01); *B23K 11/087* (2013.01); *B23K 11/16* (2013.01); *B23K 11/312* (2013.01); *B32B 15/08* (2013.01); *B32B 37/30* (2013.01); *B23K 2201/185* (2013.01); *B23K 2203/172* (2015.10); *Y10T 156/1044* (2015.01)

(58) Field of Classification Search
None
See application file for complete search history.

(56) References Cited

U.S. PATENT DOCUMENTS

| | | | | |
|---|---|---|---|---|
| 3,337,711 A | * | 8/1967 | Garscia | ................. B23K 11/34 219/92 |
| 6,656,305 B1 | | 12/2003 | Nazikkol et al. | |

FOREIGN PATENT DOCUMENTS

| | | |
|---|---|---|
| CN | 1370113 A | 9/2002 |
| CN | 101855063 A | 10/2010 |

(Continued)

*Primary Examiner* — Barbara J Musser
(74) *Attorney, Agent, or Firm* — Reinhart Boerner Van Deuren P.C.

(57) ABSTRACT

The invention relates to a method for producing a composite sheet metal part having at least one metallic region from a composite sheet metal blank which has two outer cover sheets of metal and at least one layer which is arranged between the cover sheets and consists of plastics material. The invention provides an apparatus and method by which complex formed composite sheet metal parts can easily be produced in a few steps and which still have metallic regions which can be used for joining to further parts.

6 Claims, 13 Drawing Sheets

(51) Int. Cl.
*B32B 15/08* (2006.01)
*B23K 101/18* (2006.01)
*B23K 103/16* (2006.01)

(56) References Cited

FOREIGN PATENT DOCUMENTS

| | | | |
|---|---|---|---|
| DE | 19846533 A1 | 4/2000 | |
| DE | 10111567 A1 | 9/2002 | |
| DE | 102007043015 A1 | 3/2009 | |
| DE | 102011109708 A1 * | 2/2013 | ........... B23K 11/115 |
| FR | 2709083 A1 | 2/1995 | |
| JP | 61115687 U | 7/1986 | |
| JP | H06292928 A | 10/1994 | |
| JP | 10291082 A | 11/1998 | |

* cited by examiner

METHOD FOR PRODUCING A COMPOSITE SHEET METAL PART HAVING A METALLIC REGION, AND CORRESPONDING MOLDING TOOL

CROSS-REFERENCE TO RELATED PATENT APPLICATIONS

This patent application is a continuation of PCT/EP2012/073178, filed Nov. 21, 2012, which claims priority to German Application No. 102011055654.0, filed Nov. 23, 2011, the entire teachings and disclosure of which are incorporated herein by reference thereto.

BACKGROUND OF THE APPLICATION

The invention relates to a method for producing a composite sheet metal part having at least one metallic region from a composite sheet metal blank which has two outer cover sheets of metal and at least one layer which is arranged between the cover sheets and consists of a plastics material. The invention also relates to a forming tool for producing a corresponding composite sheet metal part from a composite sheet metal blank.

Composite sheet metal parts are frequently used in the form of a sandwich sheet which has two outer cover sheets and a non-metallic layer which usually consists of plastics material and is arranged between the cover sheets. One reason for the increasing use of composite sheet metal parts is that these parts can have characteristics which, in the case of a solid material sheet, are often mutually exclusive. For example, a composite sheet metal part locally allows very good rigidities, in spite of its low weight, and at the same time can provide very good sound absorbing properties. However, many uses require these composite sheet metal parts to be joined with other sheet metal parts or metal parts. The joining methods such as fusion welding and soldering, frequently used for metal sheets, give rise to problems, however, due to the high heat supply thereof. When there is a high heat supply, the composite sheet metal part can be impaired in that the non-metallic layer or plastics layer arranged between the cover sheets is damaged. Consequently, it is often quite difficult to produce a sufficiently good join between a composite sheet metal part and a metal part. Various approaches have been tried hitherto to solve this problem. Japanese patent application JP 06-087079 A teaches preparing the region of a composite sheet metal part used for joining to further parts, for a welded joint in that the region of the composite sheet metal part is initially heated, the two outer cover sheets are bent up in the peripheral region and the plastics layer arranged between the cover sheets is removed using abrasive means. Thereafter, the cover sheets of the peripheral region are welded together, thereby providing a composite sheet metal part which has a metallic region, i.e. a region which has substantially no plastics layer and which can be used for the usual joining methods. However, this method is very complex and cannot be easily automated.

On this basis, the object of the invention is to provide a method and a forming tool by which complex formed composite sheet metal parts can be easily produced in a few steps and which still have metallic regions.

SUMMARY OF THE INVENTION

According to a first teaching of the present invention, the above-mentioned object is achieved by a method in that a composite sheet metal blank is introduced into a forming tool having two die halves, in the forming tool or before the composite sheet metal blank is introduced into the forming tool, at least one selected region of said blank is heated such that the plastics layer arranged between the outer cover layers softens there, using the forming tool, by applying a force to at least one outer cover layer, the cover sheets are pressed against each other at certain points or in certain areas in this region so that the plastics layer issues out of the region subjected to a force and a metallic region is produced, and subsequently to the application of force or at the same time as the application of force, both cover sheets are joined together at least in certain areas or at certain points in the squeezed region.

According to the invention, the at least one metallic region, preferably the metallic regions of the composite sheet metal part, i. e. the regions of the composite sheet metal part in which the plastics layer between the two cover sheets has been substantially removed is produced using a forming tool so that it is easily possible to automate the production of corresponding composite sheet metal parts. The forming tool can be arranged in a press which provides the opening and closing movements. In this respect, the production of the composite sheet metal parts having a metallic region can be integrated into existing production plants only by using forming tools. The production costs of composite sheet metal parts having at least one metallic region are reduced thereby. As already mentioned, the composite sheet metal parts produced in this manner can be joined, for example welded, to other components by the metallic regions.

According to a first embodiment of the method, the at least one selected region of the composite sheet metal blank is heated in the forming tool using means for locally regulating the temperature of said blank. For example, the forming tool surfaces which are in contact with the blank can conductively heat or regulate the temperature of the blank. On the other hand, it is also possible to use other heating methods, for example convective heating or also radiation heating. By heating regions of the composite sheet metal blank in a targeted, local manner, it is possible to remove the plastics layer between the cover sheets only in these regions. By regulating the temperature of the regions of the composite sheet metal parts via the forming tool surfaces, a heating procedure and at the same time the application of force can easily be carried out in a single step by the forming tool surfaces which are in contact with these regions or with this region of the composite sheet metal blank.

Heating elements and optionally cooling elements which regulate the temperature of the composite sheet metal blank at least in the selected region are preferably arranged in the forming tool as means for locally regulating the temperature of the blank. Heating elements can be realised by heating media guides or by electric heating elements. Cooling elements are usually provided by cooling means guides. If heating and cooling elements are provided, for example, the heating of the forming tool surfaces can be restricted particularly precisely to the requisite regions of the forming tool.

According to the next embodiment of the method, shaping means provided in the forming tool shape, deep-draw, cut and/or emboss the composite sheet metal blank during or after the production of the metallic regions. Shaping means include, for example, a deep-drawing punch, an embossing punch, a bending punch, cutting edges or knives. Consequently, the composite sheet metal blank can be subjected to additional shaping steps during the process for producing the metallic regions of the composite sheet metal part, i. e. in a single step, so that further steps are integrated into the method according to the invention.

According to the next embodiment of the method, during the forming of the metallic regions of the composite sheet metal part, the plastics material flows between the cover sheets into cavities provided in the forming tool. The direction of flow of the plastics material, displaced out of the metallic regions, can be purposefully influenced and controlled by the cavities provided in the forming tool. The temperature regulation also provides additional control options. In particular, the cavity makes it possible for the blank to expand in the regions in which the plastics material is displaced.

According to a further embodiment, if metallic cover sheets are used, the deformation resistance of which is greater than the force of the displaced plastics material and if the displaced plastics material cannot cause the deformation of the cover sheets, provided for example in the cavities located in the forming tool are means for penetrating the metallic cover layer as well as means for suctioning away the plastics material issuing out of the openings produced in the cover sheets as a result of the plastics material displacement, which means can suction away the displaced plastics material.

According to the next variant of the method, a ready-trimmed composite sheet metal part can be provided by trimming the composite sheet metal blank using cutting means provided in the forming tool after the introduction of the metallic regions. The integration of the cutting procedure into the shaping or production process for the provision of the metallic regions leads to a further enhancement of automation, since a trimming procedure outside the forming tool is no longer necessary and a substantially finished composite sheet metal part can be produced.

According to a second teaching of the present invention, the above-mentioned object is achieved by a forming tool for producing a composite sheet metal part, comprising
- at least two die halves which are movable relative to one another,
- means for receiving a composite sheet metal blank in one die half,
- means for applying a force to at least one outer cover sheet in at least one selected region of the composite sheet metal blank, so that the cover sheets are pressed against each other at certain points or in certain areas so that the plastics material can at least partly issue in the selected region of the blank and a metallic region is produced, and comprising
- means for forming the composite sheet metal bank into a composite sheet metal part.

With a blank which is heated in the selected regions, for example outside the tool, a corresponding forming tool is able to apply a force to the selected region or regions so that the cover sheets are pressed together and the plastics layer arranged between the cover sheets issues out of the selected heated regions of the blank or is substantially removed there. The production process for composite sheet metal parts having a metallic region is greatly simplified by the use of the forming tool according to the invention.

According to a first embodiment of the forming tool, provided in the tool are temperature regulating means to regulate the temperature of the composite sheet metal blank in the selected regions. The temperature regulating means can, for example, heat the surfaces of the forming tool or can come into direct contact with the blank. Furthermore, temperature regulating means are also possible which heat the blank convectively or by radiation.

The temperature regulating means preferably comprise heating means and cooling means. Through the use of heating means and cooling means, selected regions can be heated in a targeted manner and the transfer of heat into other regions of the forming tool can be purposefully prevented by the arrangement of cooling means. Consequently, the selected regions of the composite sheet metal blank, from which the plastics material is to be removed, can be heated locally in a targeted manner. Restricting the heating to only the necessary regions of the forming tool can achieve a significantly higher process reliability during the production of the composite sheet metal parts. It is also possible to prevent the transfer of heat out of heated regions of the forming tool into adjacent regions of the tool using materials of a low thermal conduction.

According to the next embodiment of the forming tool, provided in the tool are means by which the composite sheet metal blanks can be shaped, deep-drawn, cut and/or embossed during or after the production of the metallic regions. These additional means make it possible to integrate further working steps into the provision of the metallic regions of the composite sheet metal part and allow a further enhancement of the automation. In particular, these means allow the composite sheet metal part to be produced in a finished state in the forming tool, thereby obviating the need for further working steps.

Also preferably provided in the forming tool are means for joining the cover sheets of the at least one metallic region of the composite sheet metal part, so that the cover sheets can be joined in the metallic regions in the forming tool. For example, a laser welding beam in the forming tool could produce punctiform or seam-shaped joints by a glass fibre. Furthermore, the arrangement of joining electrodes for resistance welding is also possible.

At least one mould cavity is preferably provided which is used to receive thickened regions of the composite sheet metal blank. These thickened regions of the blank are produced by the flow of the plastics material out of the selected, heated regions. The blank can expand in the mould cavities provided for this purpose.

Alternatively or cumulatively, according to a further embodiment, a suction device can be provided for removing the plastics material after it has issued out of the selected regions of the blank. The suction device makes it possible, for example, instead of a mould cavity, to suction up the issuing plastics material directly in the discharge region and to thereby remove it. It is thus possible in principle to dispense with a mould cavity. Nevertheless, the combined use of mould cavities and/or means for penetrating the metallic cover sheets and suction devices is also possible.

BRIEF DESCRIPTION OF THE DRAWINGS

In the following, the invention will be described in more detail with reference to embodiments in conjunction with the drawings, in which.

DETAILED DESCRIPTION OF THE INVENTION

The embodiments of the composite sheet metal blank, illustrated in FIG. 1 to 11b) have cover sheets, as indicated in the figures, which have a smaller wall thickness than the plastics layer arranged between the cover sheets. However, the drawings are not true to scale. For example, the metallic cover sheets can have a wall thickness of 0.1 mm to 0.3 mm, whereas the plastics layer has a wall thickness of 0.35 mm to 0.8 mm. Corresponding composite parts have considerable weight advantages over solid materials and can be joined particularly effectively by the method according to the invention.

Figure 1:
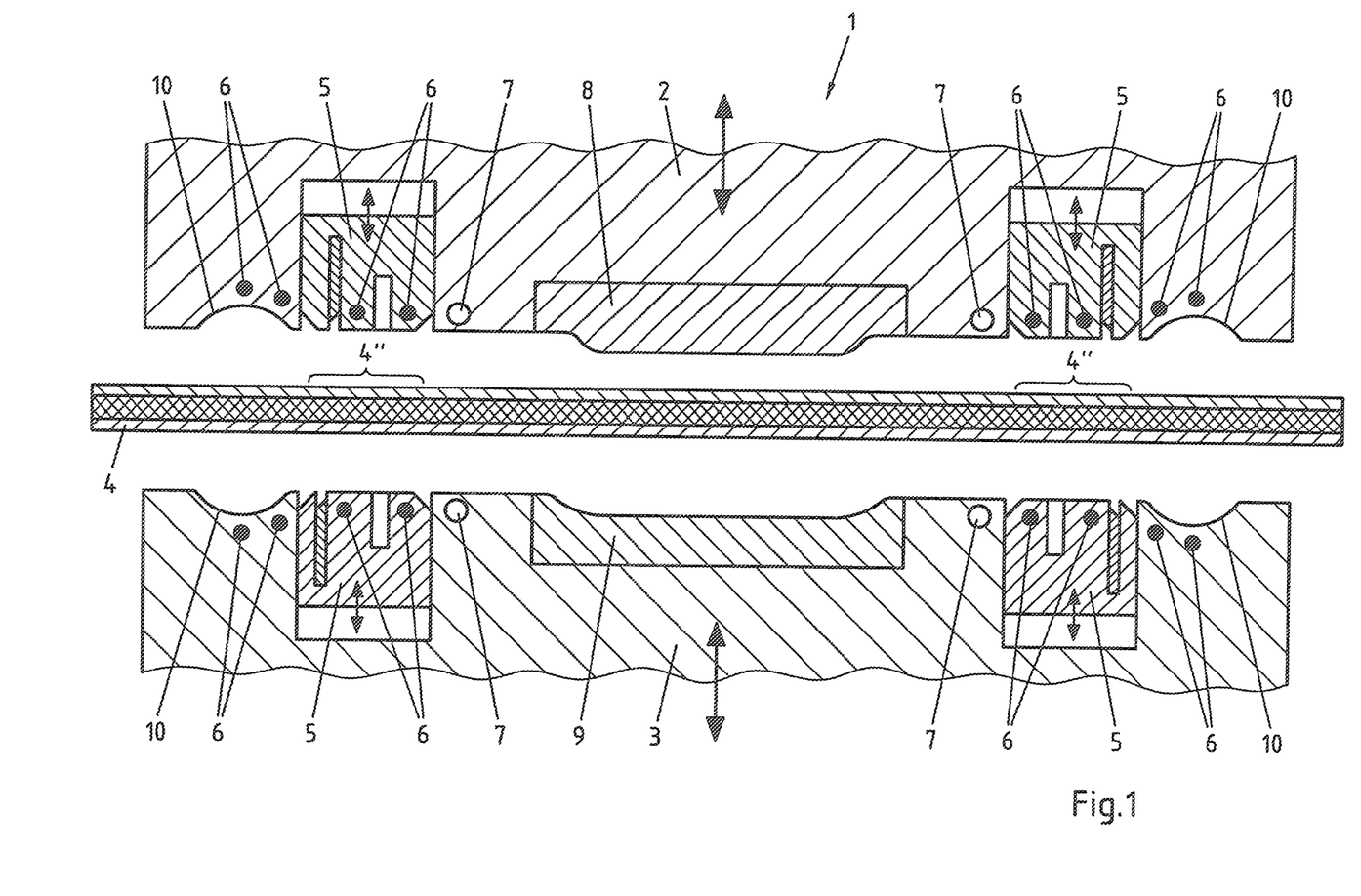
FIG. 1 to FIG. 5 show an embodiment of a forming tool during implementation of an embodiment of the method, FIG. 6a) to d) are schematic sectional views of composite sheet metal parts produced according to the invention, FIG. 7a) to e) are schematic views of the production of a composite sheet metal part having a metallic region and the application thereof to further components, FIGS. 8a) and b) show a second embodiment of a forming tool according to the invention for producing deep-drawn composite sheet metal parts during two different method steps, and FIG. 9a) to 11b) show a third embodiment of a forming tool according to the invention, during implementation of an embodiment of the method.

First of all, FIG. 1 is a schematic sectional view of a forming tool 1 consisting of two die halves 2, 3, between which a composite sheet metal blank 4 is introduced. In the present case, the composite sheet metal blank 4 is planar. However, it can optionally also be subjected to further shaping steps before it is introduced into the forming tool. Furthermore, provided in the forming tool 1 are force applying means 5 both in the upper die half 2 and in the lower die half 3 in the form of movable punches 5. In addition, the forming tool 1 comprises means in the form of an embossing punch 8 and a die plate 9 for forming the composite sheet metal blank. The two die halves 2, 3 can be moved relative to one another so that the forming tool 1 can be opened and closed.

Here, the heating elements 6 and the cooling elements 7 make it possible to heat two selected regions of the composite sheet metal blank 4 in a correspondingly intense manner, so that the force application means, in the form of the punch 5 which is preferably also temperature-regulated can press the plastics material out of this region 4" of the blank 4 into the mould cavity 10. For this purpose, the punches 5 are arranged such that they are movable in their vertical position. The next figures show how the plastics material 4b is removed in the correspondingly selected region 4".

Figure 2:
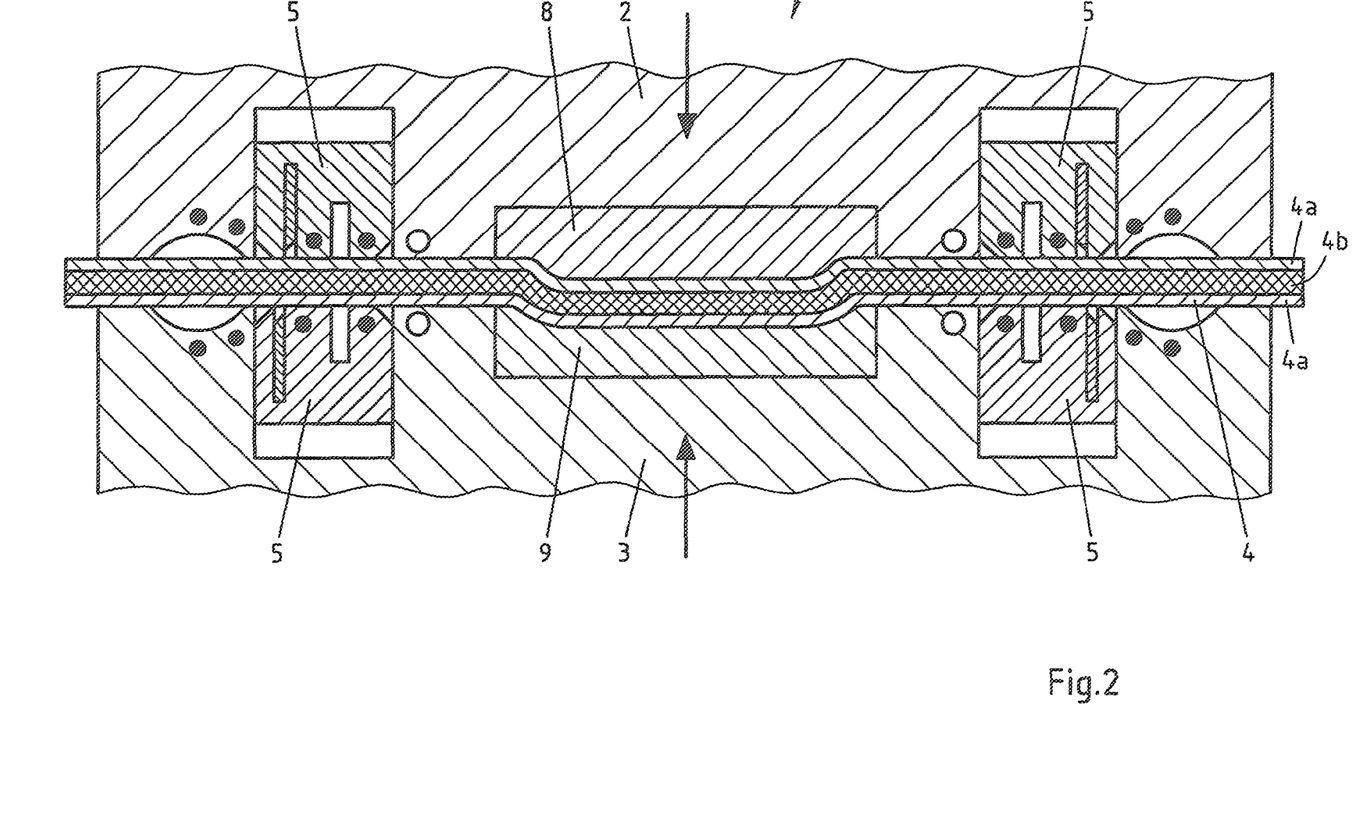

Thus, FIG. 2 shows the forming tool 1 in its closed state, the forming punch 8 having already moulded the composite sheet metal blank 4, consisting of the cover sheets 4a and the plastics layer 4b, into the die plate 9. The embodiment shows very clearly how further working steps can be integrated into the process for producing the composite sheet metal parts 40 having a metallic region. The temperature regulating means 6, 7 can be in contact with the part 4 or are arranged such that the surfaces of the forming tool which contact the composite sheet metal part are heated, so that the corresponding regions of the composite sheet metal part are heated and the plastics layer 4b of the part 4 softens there. In this respect, the cooling means 7 ensure that the plastics layer 4b only softens in the present selected peripheral region of the sheet blank 4 and can thereby be squeezed out. Thus, these means work together with the provided cavity 10 into which the blank can expand.

Figure 3:
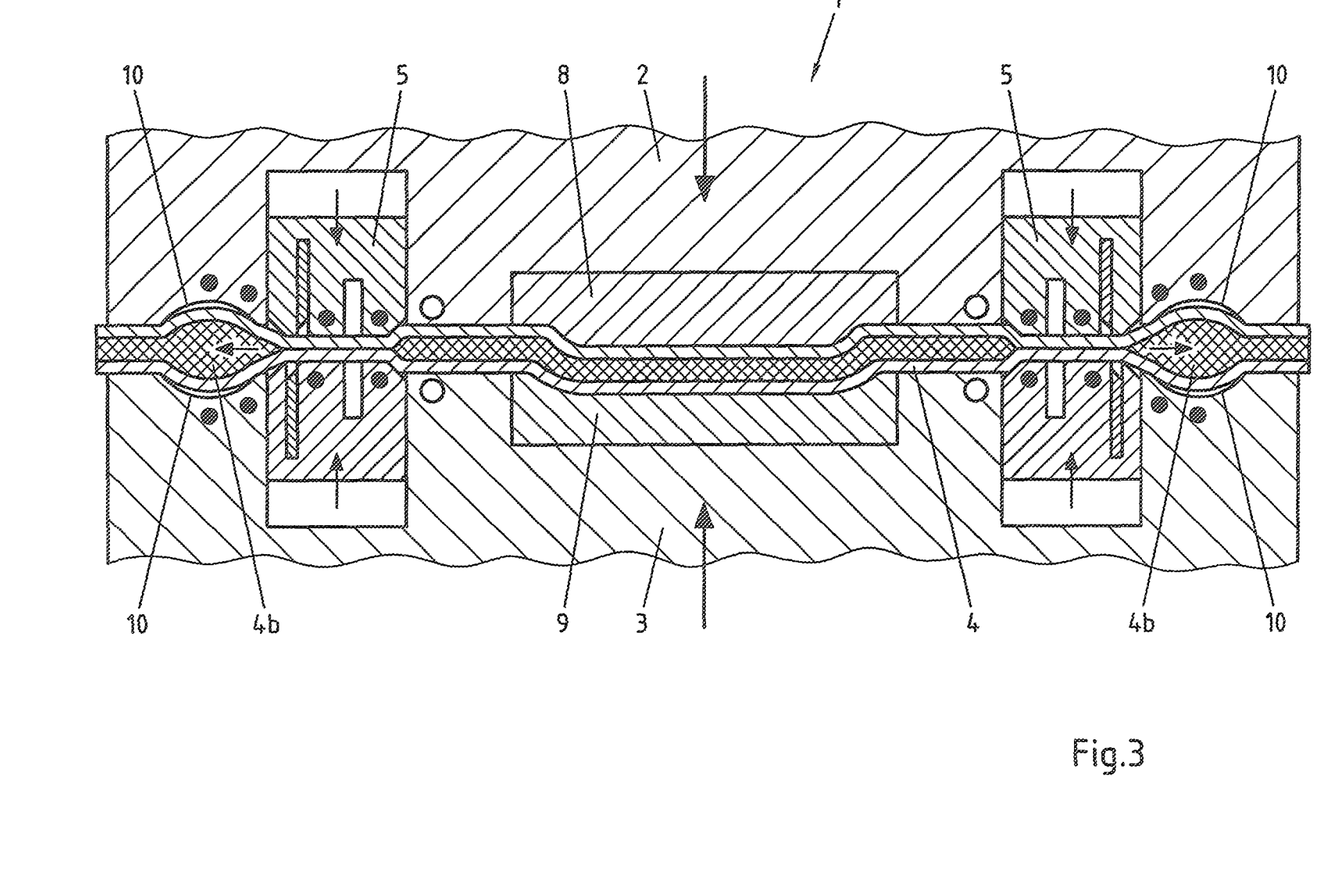

This is shown by FIG. 3, where it can be seen that the punches 5 have now also been moved relative to one another, so that a force has been exerted on the blank 4 in the region of the punches 5 and the plastics material 4b is displaced outwards. The punches 5 can move when the tool 1 is closed or when it is still partly open. It can also be seen that the plastics material 4b is displaced into the mould cavity 10, so that the blank 4 can have a greater thickness in this region. Consequently, the plastics material can easily issue out of the regions in which the punch 5 applies a force to the blank 4.

Figure 4:
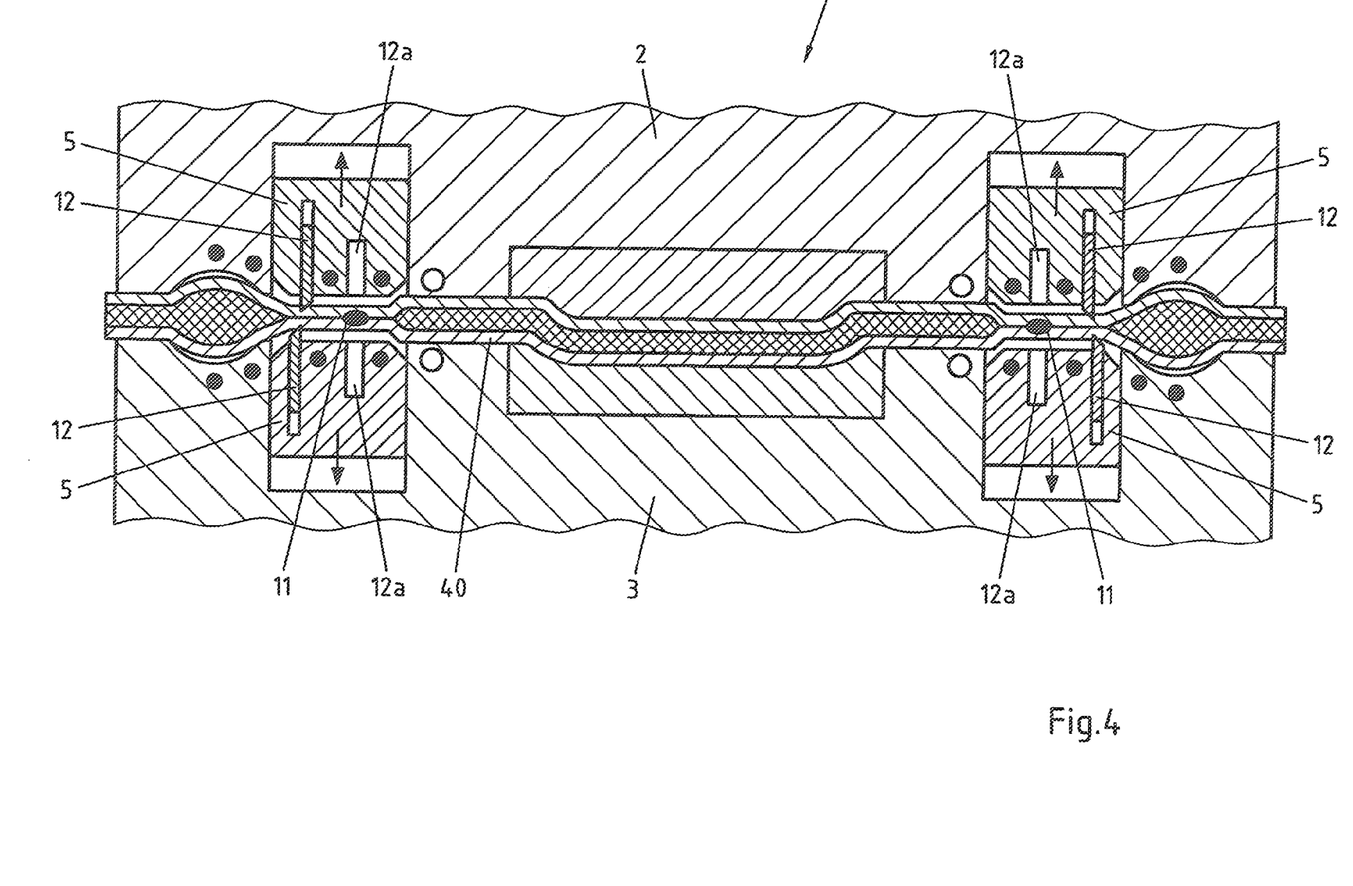
Figure 5:
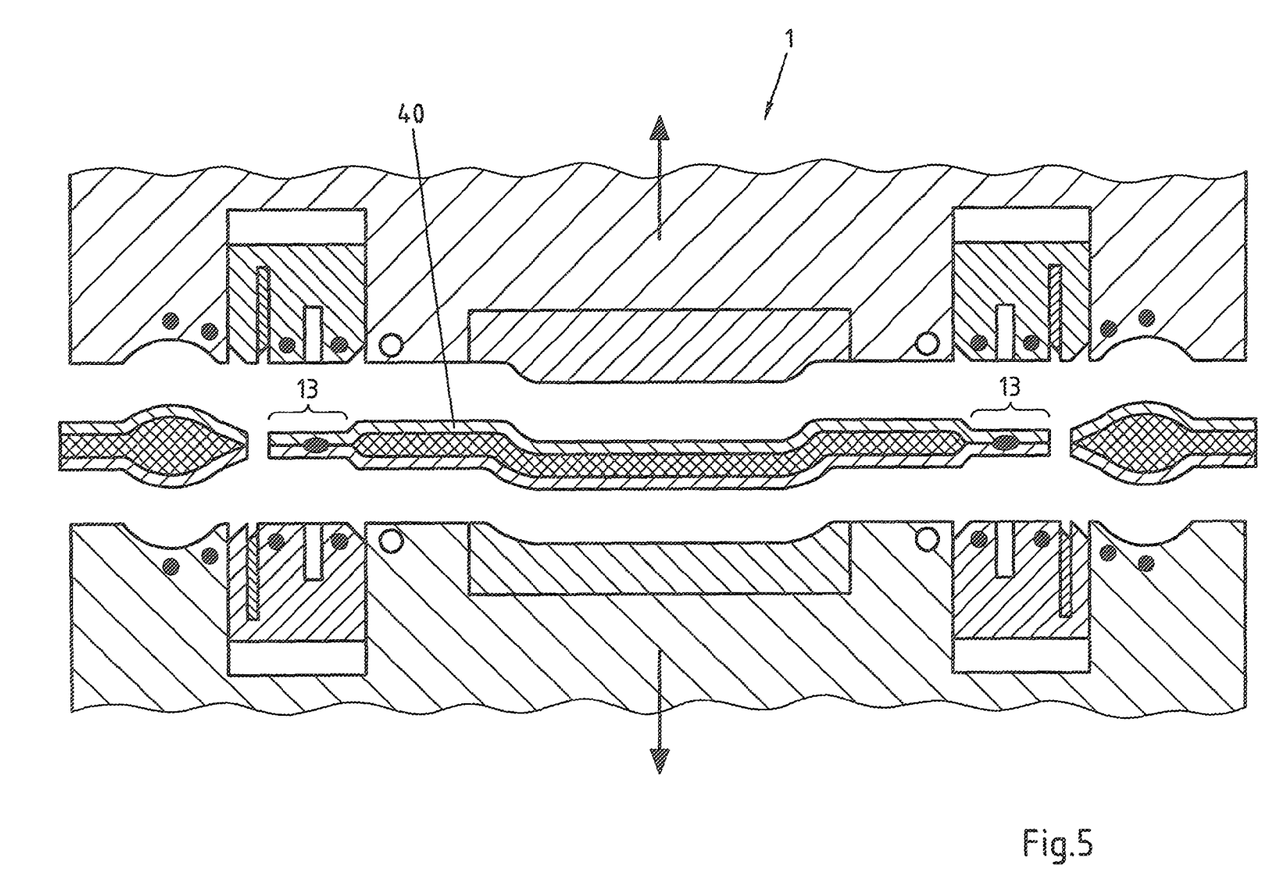
Figure 6A:
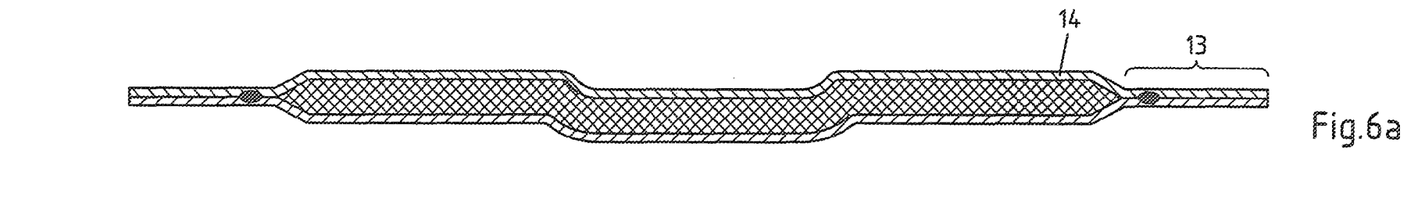
Figure 6B:
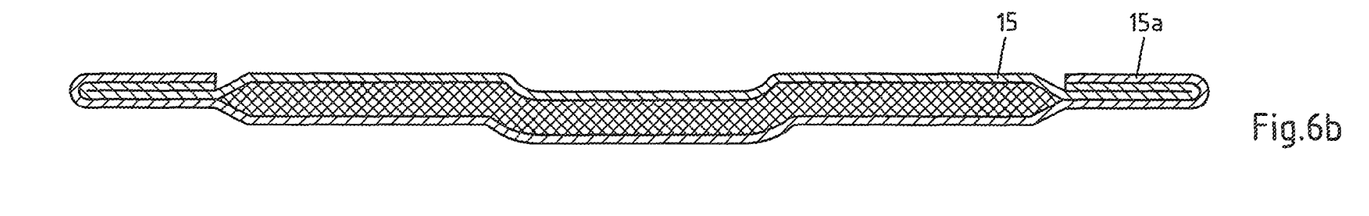
Figure 6C:
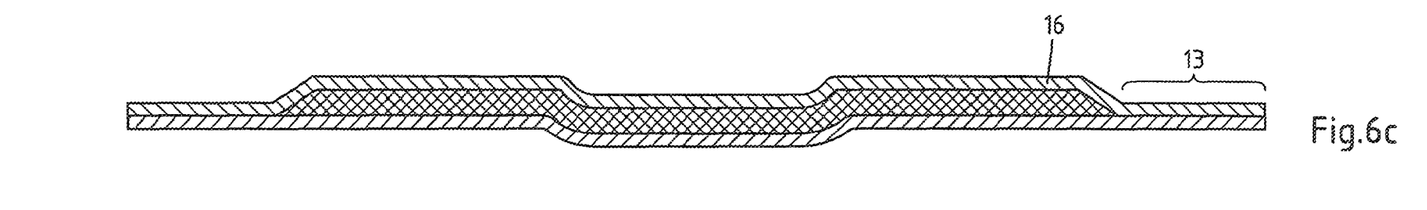
Figure 6D:
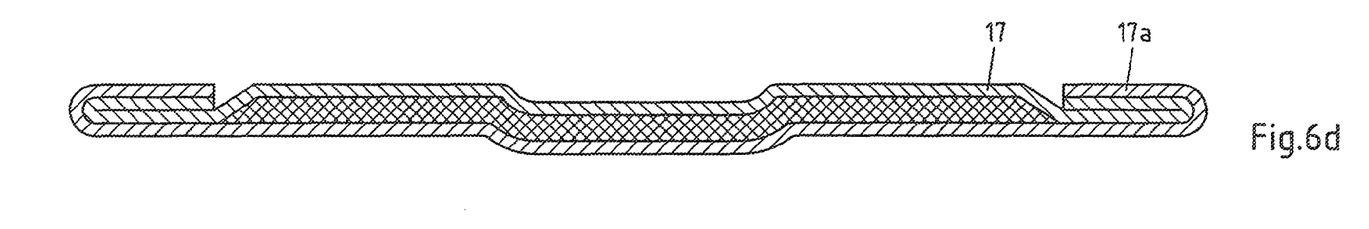

FIG. 4 shows the forming tool 1 from FIG. 1 to 3, again with the punches 5 moved in. However, in the meantime, the blank 4 has been joined in certain areas by a seam 11 in the metallic region using the indicated joining means 12a. The outer regions of the composite sheet metal part 40 which have been thickened can be separated from the finished part 4 using cutting edges 12 which are indicated here. This is illustrated in FIG. 5 which shows the forming tool 1 in a re-opened state. After the tool has been opened, a finished composite sheet metal part 4' is provided having metallic regions 13 which are particularly suitable for joining the composite sheet metal part to further parts. FIG. 6a) to 6d) are sectional views of different embodiments of composite sheet metal parts, produced by the method according to the invention. It can be seen in particular in the sectional views that the composite sheet metal part 14, 15, 16 and 17 has formed regions in which the sandwich structure of the composite sheet metal part exists, and in addition regions 13 are provided which are purely metallic and can be used for joining to further components. In this respect, the composite sheet metal parts 14 and 16 differ from one another in that the metallic region 13 has been produced by a bilateral application of force (composite sheet metal part 14) or by a unilateral application of force (composite sheet metal part 16). A particularly effective method of joining the composite sheet metal part 14, 15, 16, 17 to a further composite sheet metal part is by the production of a fold 15a, 17a, as shown in FIG. 6b) and FIG. 6d). The fold 15a, 17a can, for example, increase the thickness in the purely metallic region to such an extent that no difference in thickness remains between the part of the composite sheet metal component provided with plastics material and the metallic region. Furthermore, a fold 17a also affords the possibility of implementing a positive locking or a force locking with a further part or of producing the fold for a material-uniting join by, for example, a welding method.

Figure 7A:
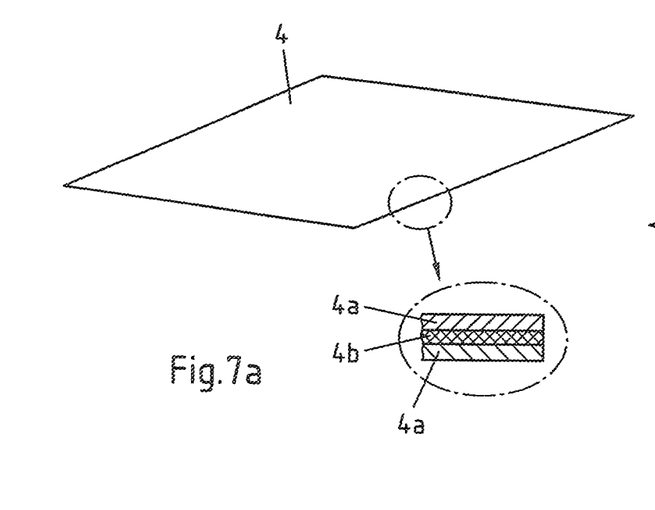

In addition to shaped regions, for example embossed or deep-drawn regions, the method according to the invention also affords the possibility of making cutouts in the composite sheet metal part using the forming tool and of simultaneously providing said cutouts with a metallic peripheral region. This is shown in FIG. 7a) to 7e). The starting point of the method is usually a composite sheet metal blank 4 with two metallic cover sheets 4a and an interlying plastics layer 4b, as shown in an enlarged detail in FIG. 7a). By the method according to the invention, the blank 4 is then formed, is provided with a metallic region 13 and at the same time holes 18 are cut into the composite sheet metal part, thereby making it possible to provide an application-specific composite sheet metal part 19.

Figure 7B:
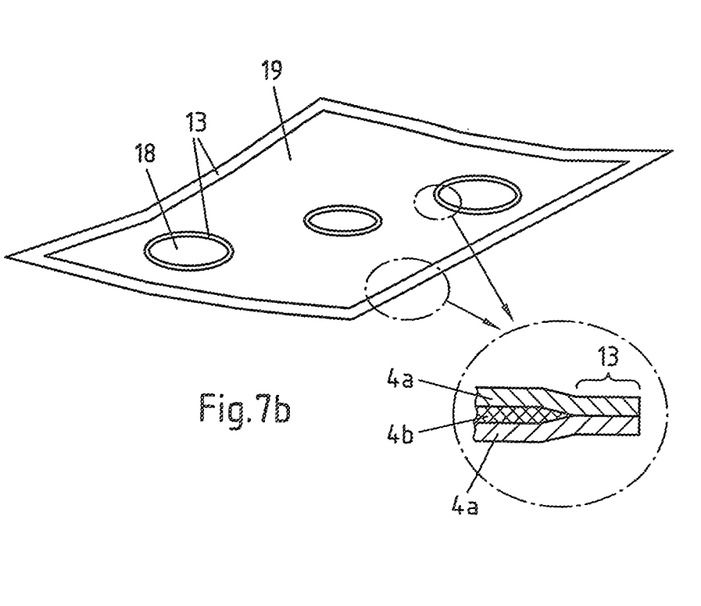

As can be seen in the enlarged detail in FIG. 7b), not only does the peripheral region of the composite sheet metal part 19 have a metallic region 13, but so do the internal holes 18 in the composite sheet metal part 19.

Figure 7C:
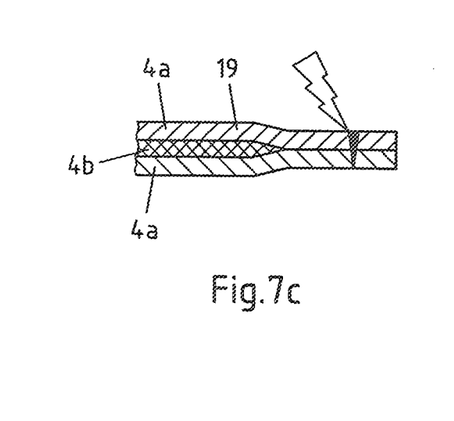
Figure 7D:
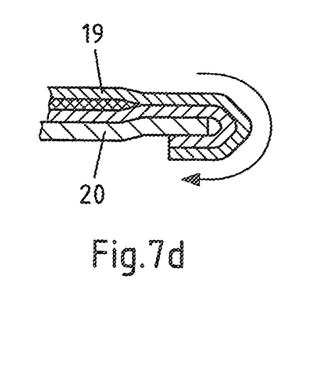
Figure 7E:
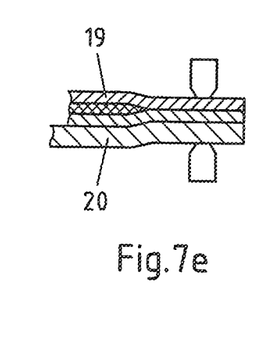

As already stated, the metallic regions can be joined at certain points or in certain areas, FIG. 7c). This figure shows, for example, a laser beam welding method for joining the composite sheet metal part 19 in certain areas or at certain points. FIG. 7d) and FIG. 7e) show in a schematic sectional view further joining options with a further component 20. The composite sheet metal part 19 is joined with the component 20 by a fold or a seam which has been produced by a resistance joining method, for example. Composite sheet metal parts 19 can be used thus in a particularly simple manner in automobile construction, as a bonnet for example.

Figure 8A:
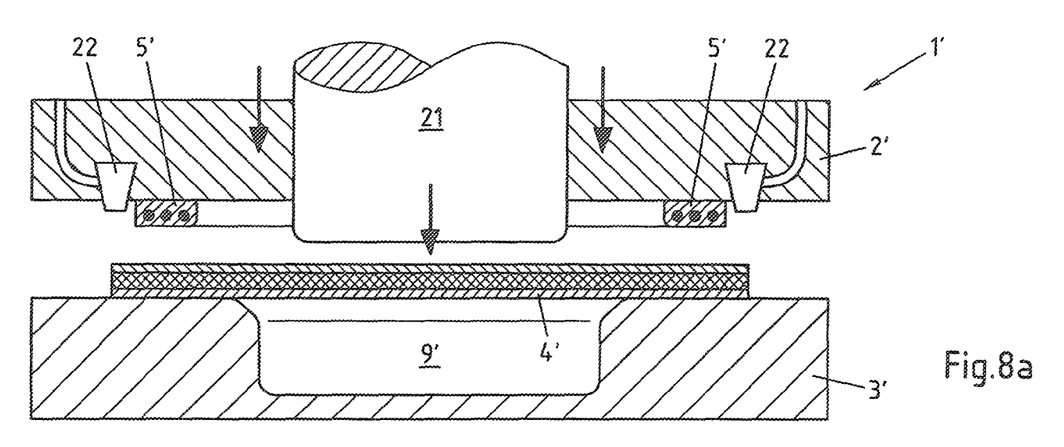
Figure 8B:
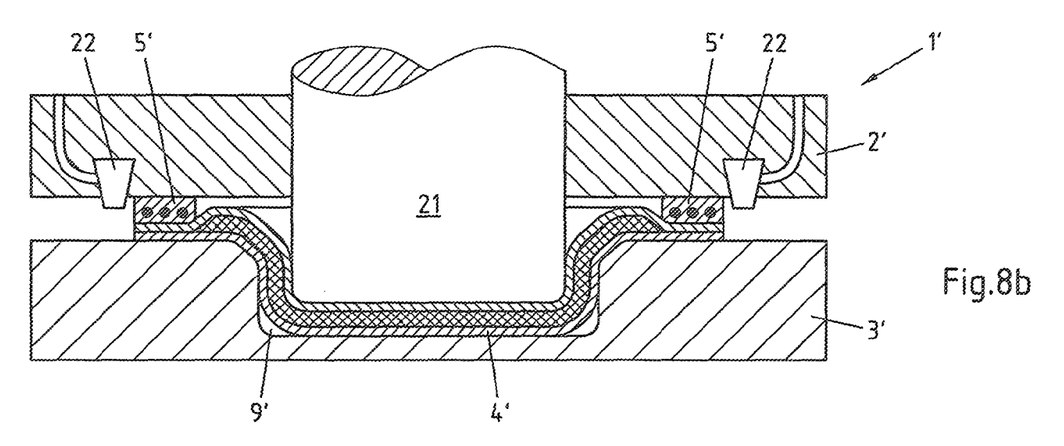

A further embodiment of the method according to the invention is shown in FIG. 8a) and FIG. 8b). The figures show a forming tool 1' with means 5' for applying a force to a region of a composite sheet metal blank 4'. Provided as the forming means is a deep-drawing punch 21 which deep-draws the unheated region of the blank 4' into a die plate 9' provided in the lower tool half 3'. The force application means 5', shown here as a fixed punch, are regulated in temperature and they conductively heat the blank 4' upon contact in a specific region. The plastics material is then pressed out of these regions and suctioned away by a suction device 22. As a result, the forming tool can also deep-draw a composite sheet metal blank 4' into a composite sheet metal part and at the same time can produce a metallic region, in particular a metallic peripheral region in a single working step.

Figure 9A:
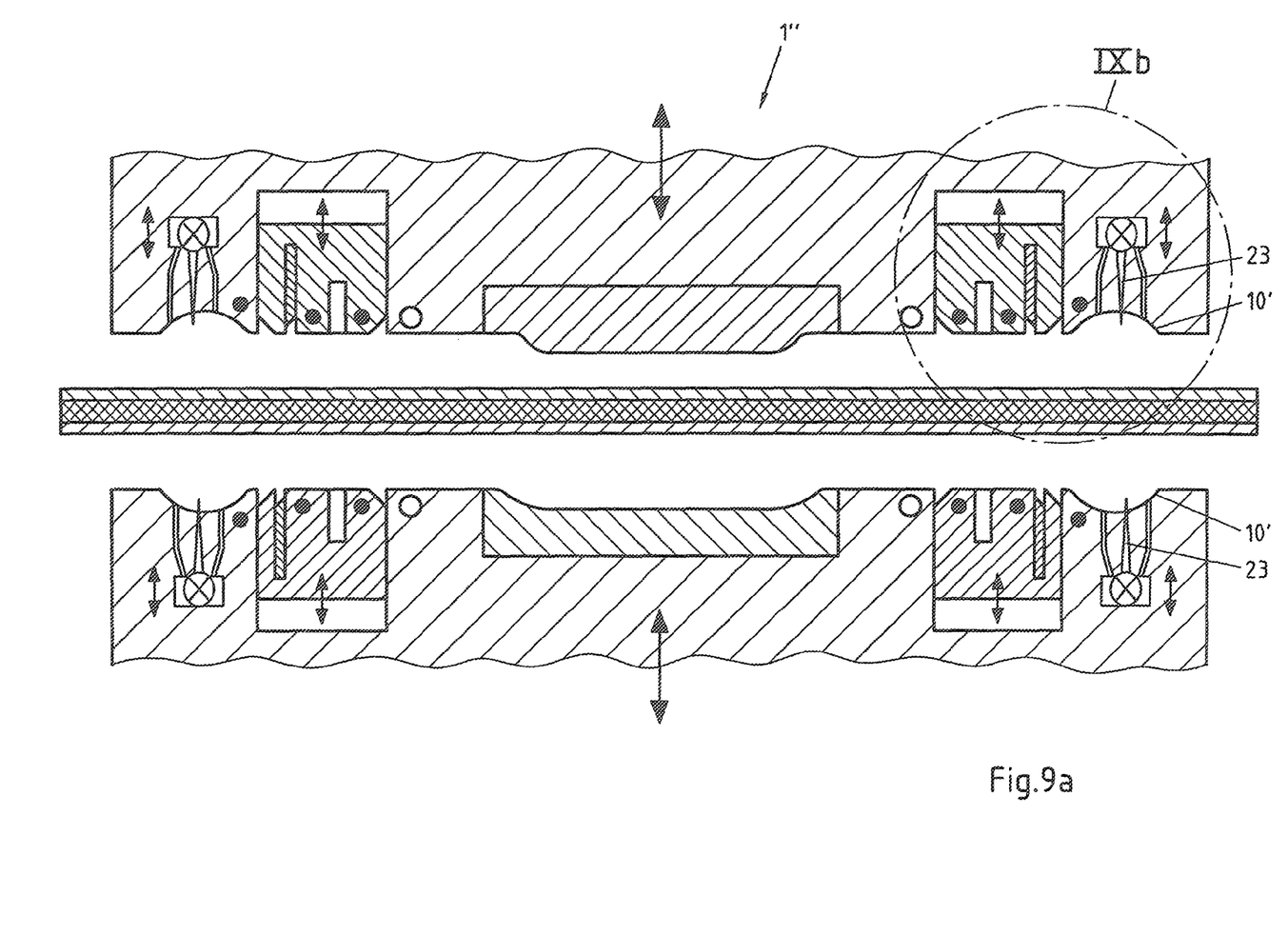
Figure 9B:
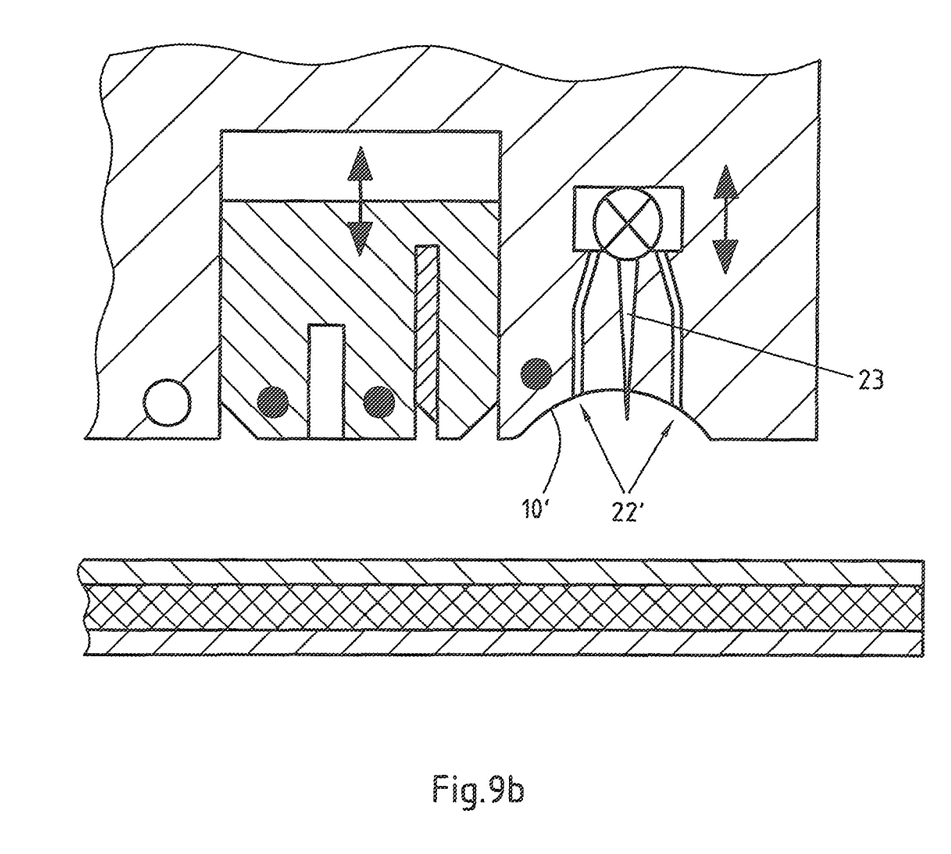
Figure 10:
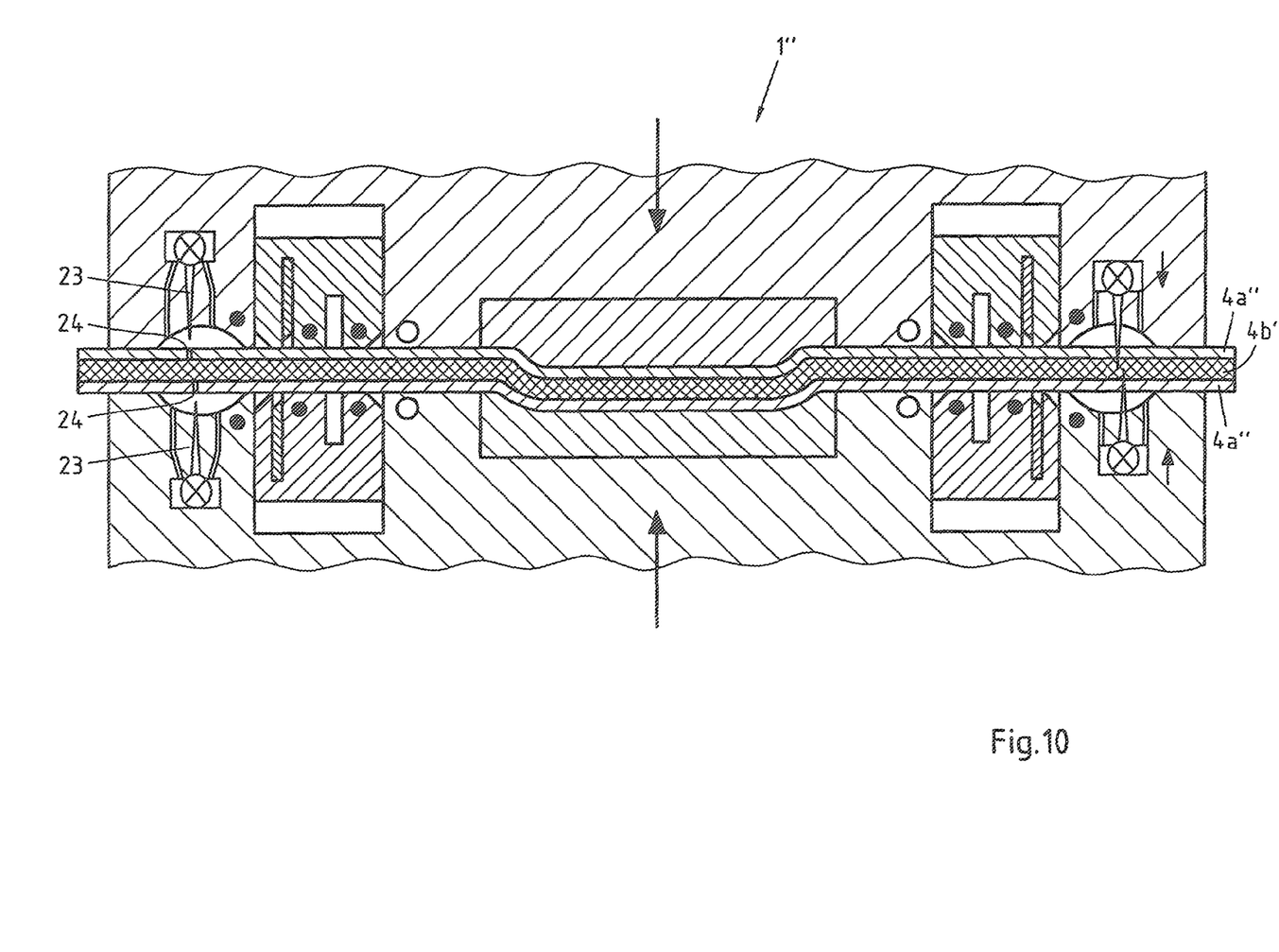
Figure 11A:
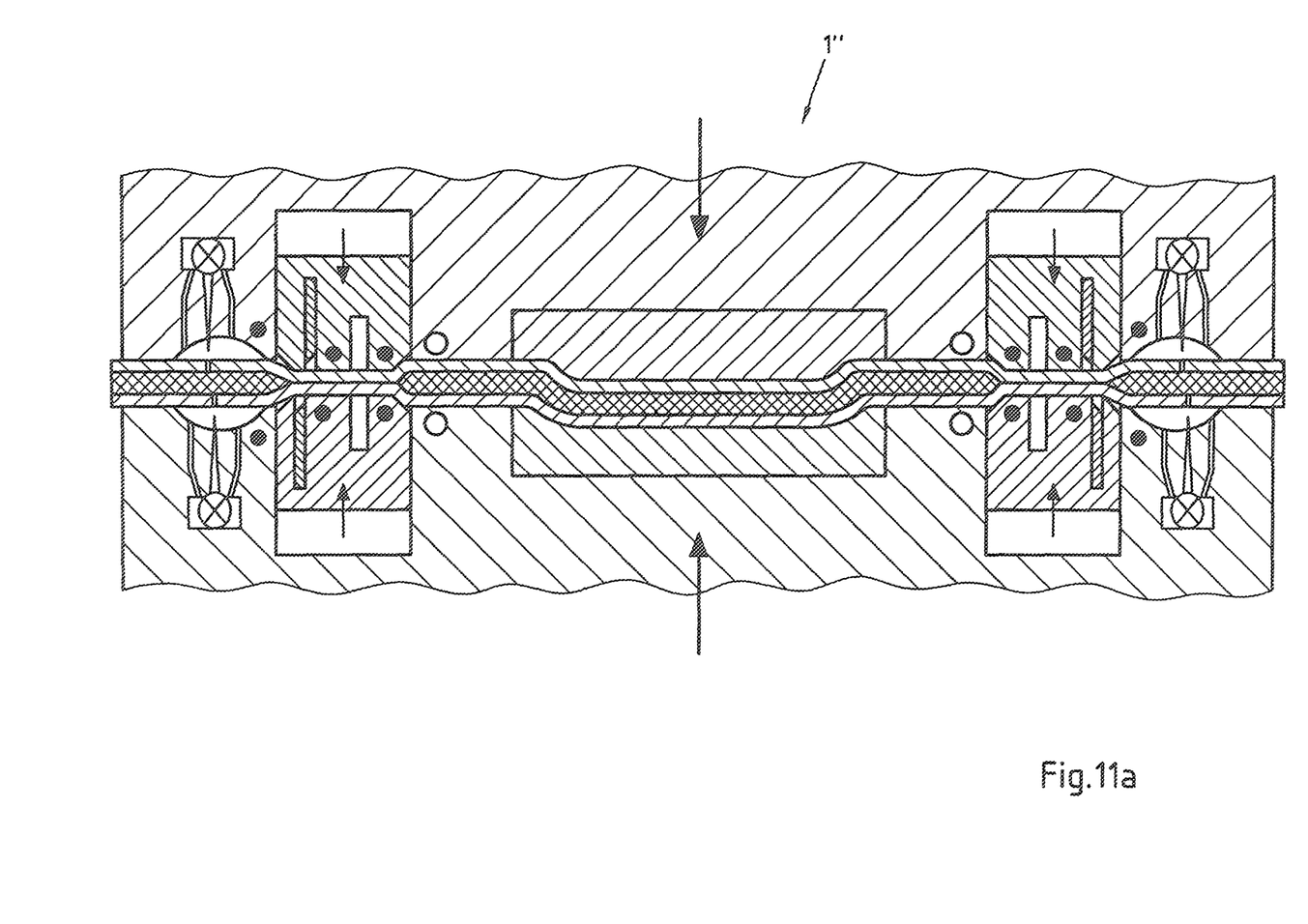
Figure 11B:
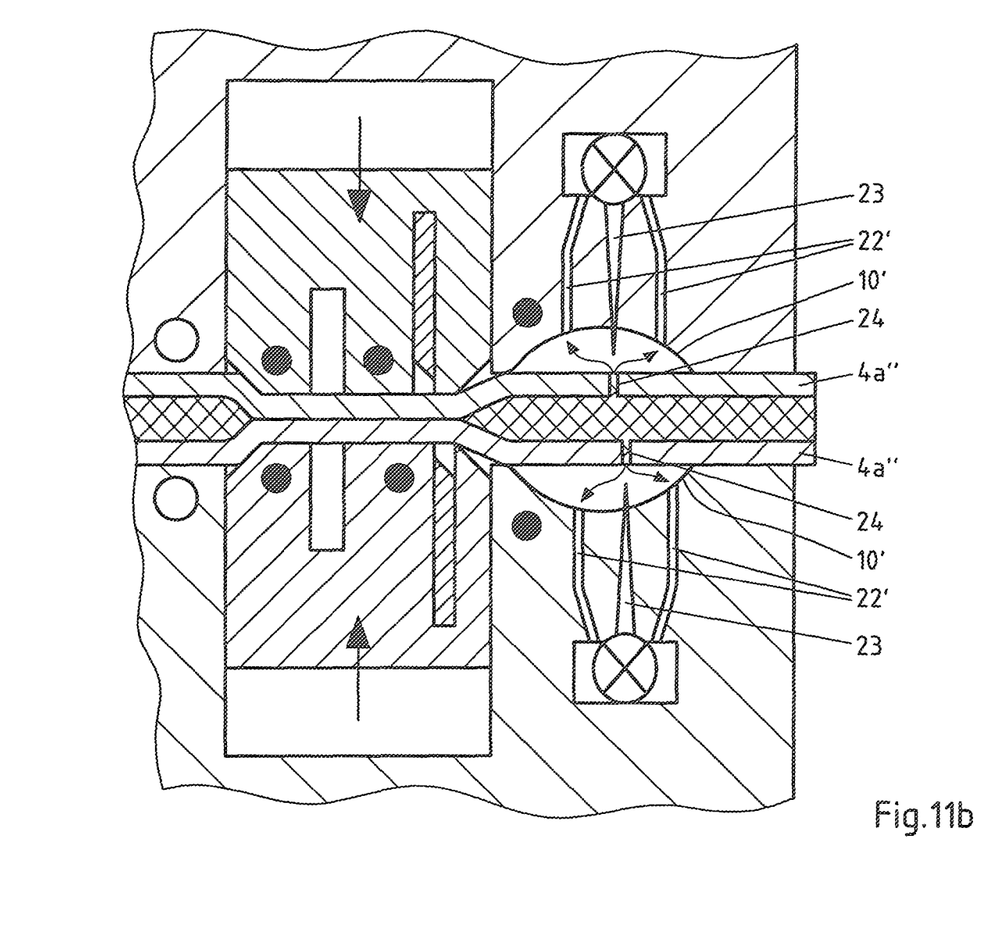

A further embodiment of the method according to the invention is shown in FIG. 9a) to FIG. 11b). The figures show a forming tool 1" which substantially corresponds to the configuration of the forming tool 1 according to FIG. 1) to 5) and so the basic components of the forming tool will not be discussed in more detail here. The difference is that provided in the mould cavities 10' are means for penetrating the metallic cover sheet, here using the example of an axially displaceable, local piercing spike 23 and a suction device or suction channels which are connected to a suction device and open in the mould cavity 10' (FIG. 9b)).

FIG. 10 shows the forming tool 1" in the closed state. The metallic cover sheets 4a" can be penetrated or pierced by the spike 23 before, during or after the heating of the corresponding regions of the composite sheet metal part. The suction device, also arranged in the mould cavities 10' or suction channels 22' which are connected to a suction device suction away the plastics material issuing out of the temperature-regulated region and through the openings 24 made in the metallic cover sheets 4a".

Consequently, composite sheet metal parts can be produced thus for highly diverse purposes of use, for example in automobile construction, shipbuilding, aircraft construction or also for the domestic appliance industry.

The invention claimed is:

1. Method for producing a composite sheet metal part having at least one metallic region from a composite sheet metal blank which has two outer cover sheets of metal and at least one layer which is arranged between the cover sheets and consists of a plastics material, the method comprising:
   introducing a composite sheet metal blank into a forming tool;
   heating, in the forming tool or before the composite sheet metal blank is introduced into the forming tool, at least one selected region of said blank such that the plastics layer arranged between the outer cover layers softens;
   pressing, using the forming tool by applying a force to at least one outer cover layer of the composite sheet metal blank, the cover sheets against each other at certain points or in certain areas in the at least one selected region so that the plastics layer issues out of the at least one region subjected to a force and a metallic region is produced,
   subsequently to the application of force or at the same time as the application of force, both cover sheets are joined together at least in certain areas or at certain points in a squeezed region, and
   wherein heating elements which regulate the temperature of the composite sheet metal blank at least in the selected region are arranged in the forming tool as means for locally regulating the temperature of the blank.

2. Method according to claim 1, wherein shaping means provided in the forming tool shape, deep-draw, cut and/or emboss the composite sheet metal blank during or after the production of the metallic regions.

3. Method for producing a composite sheet metal part having at least one metallic region from a composite sheet metal blank which has two outer cover sheets of metal and at least one layer which is arranged between the cover sheets and consists of a plastics material, the method comprising:
   introducing a composite sheet metal blank into a forming tool;
   heating, in the forming tool or before the composite sheet metal blank is introduced into the forming tool, at least one selected region of said blank such that the plastics layer arranged between the outer cover layers softens;
   pressing, using the forming tool by applying a force to at least one outer cover layer of the composite sheet metal blank, the cover sheets against each other at certain points or in certain areas in the at least one selected region so that the plastics layer issues out of the at least one region subjected to a force and a metallic region is produced,
   subsequently to the application of force or at the same time as the application of force, both cover sheets are joined together at least in certain areas or at certain points in a squeezed region, and
   wherein during the production of the metallic regions of the composite sheet metal part, the plastics material flows between the cover sheets into cavities provided in the forming tool.

4. Method according to claim 3, wherein shaping means provided in the forming tool shape, deep-draw, cut and/or emboss the composite sheet metal blank during or after the production of the metallic regions.

5. Method for producing a composite sheet metal part having at least one metallic region from a composite sheet metal blank which has two outer cover sheets of metal and at least one layer which is arranged between the cover sheets and consists of a plastics material, the method comprising:
   introducing a composite sheet metal blank into a forming tool;
   heating, in the forming tool or before the composite sheet metal blank is introduced into the forming tool, at least one selected region of said blank such that the plastics layer arranged between the outer cover layers softens;
   pressing, using the forming tool by applying a force to at least one outer cover layer of the composite sheet metal blank, the cover sheets against each other at certain points or in certain areas in the at least one selected region so that the plastics layer issues out of the at least one region subjected to a force and a metallic region is produced,
   subsequently to the application of force or at the same time as the application of force, both cover sheets are joined together at least in certain areas or at certain points in a squeezed region, and wherein the composite sheet metal blank is trimmed by cutting means provided in the forming tool after the introduction of the metallic regions.

6. Method according to claim 5, wherein shaping means provided in the forming tool shape, deep-draw, cut and/or emboss the composite sheet metal blank during or after the production of the metallic regions.

\* \* \* \* \*